United States Patent [19]

Thebault

[11] Patent Number: 5,026,604

[45] Date of Patent: Jun. 25, 1991

[54] COMPOSITE MATERIAL WITH REFRACTORY FIBROUS REINFORCEMENT AND CERAMIC MATRIX

[75] Inventor: Jacques Thebault, Bordeaux, France

[73] Assignee: Societe Europeenne de Propulsion, Puteaux, France

[21] Appl. No.: 178,247

[22] Filed: Apr. 6, 1988

Related U.S. Application Data

[62] Division of Ser. No. 756,347, Jul. 18, 1985, Pat. No. 4,752,503.

[30] Foreign Application Priority Data

Jul. 20, 1984 [FR] France ................................ 84 11591

[51] Int. Cl.$^5$ .............................................. B32B 9/00
[52] U.S. Cl. ................................... 428/367; 428/368; 428/375; 428/378; 428/388; 428/698; 428/902; 428/903
[58] Field of Search ............... 428/367, 368, 375, 378, 428/388, 902, 903, 698

[56] References Cited

U.S. PATENT DOCUMENTS

| | | |
|---|---|---|
| 3,895,084 | 7/1975 | Bauer . |
| 3,925,577 | 12/1975 | Fatzer et al. . |
| 3,991,248 | 11/1976 | Bauer . |
| 4,131,697 | 12/1978 | Randon et al. . |
| 4,178,413 | 12/1979 | De Munda . |
| 4,241,104 | 12/1980 | Torbet . |
| 4,343,836 | 8/1982 | Newkirk et al. ..................... 427/255 |
| 4,397,901 | 8/1983 | Warren . |
| 4,405,685 | 9/1983 | Honjo et al. ..................... 427/255.7 |
| 4,472,476 | 9/1984 | Veltri et al. . |
| 4,487,799 | 12/1984 | Galasso et al. . |
| 4,511,663 | 4/1985 | Taylor ................................... 428/379 |
| 4,515,860 | 5/1985 | Holzl . |
| 4,605,588 | 8/1986 | Simpson et al. ..................... 428/375 |
| 4,748,079 | 5/1988 | Thebault ............................. 428/378 |

FOREIGN PATENT DOCUMENTS 2131407 12/1980 Fed. Rep. of Germany .
2401888 3/1979 France .
2520730 8/1983 France .
1457757 12/1976 United Kingdom .

OTHER PUBLICATIONS

Relationship Between Structure and Strength for CVD Carbon Infiltrated Substrates by D. W. Bauer, W. V. Kotlensky, (Oct. 1970).
Chemical Abstracts, vol. 100, No. 12, Mar. 1984, (p. 279), No. 90230k, Columbus, Ohio, H. Hannache et al.
Advances in Composite Materials, vol. 2, pp. 1084–1097, (1980), "The Carbon Fiber-Carbon and Silicon Carbide Binary Matrix Composites a New Class of Materials for High Temperature Applications", R. Naslain, P. Hagenmuller, F. Christin, L. Heraud, JJ. Choury.
Journal of Materials Science, 9 (1974), pp. 1933–1948, "The Fabrication of Ceramic-Coated Fibre Duplex Elements", J. J. Chappell, R. S. Millman.
Tenth Biennial Conference on Carbon Defense Ceramic Information Center, (1971).
An Introduction to Carbon Composite Materials by J. W. Warren and C. D. Coulbert, Super-Temp Company, Division of Ducommun Inc., (1971), pp. 3–14.

Primary Examiner—George F. Lesmes
Assistant Examiner—Beverly A. Pawlikowski

[57] ABSTRACT

A composite structure having a fibrous reinforcing body formed from fibers of a refractory material, a ceramic matrix surrounding the fibers of the reinforcing body and an intermediate layer of a refractory material having a laminar structure disposed between the fibers of the refractory material having a laminar structure disposed between the fibers of the refractory material and the ceramic matrix and adherent to both. The intermediate layer has a thickness sufficient to reduce the susceptibility of the structure to crack propagation and to increase impact strength but not exceeding 3.0 microns. The intermediate layer is also elastically deformable in shear and has an elongation at break greater than the matrix.

6 Claims, No Drawings

COMPOSITE MATERIAL WITH REFRACTORY FIBROUS REINFORCEMENT AND CERAMIC MATRIX

This application is a divisional application of copending U.S. Pat. Application Ser. No. 756,347, filed on July 18, 1985 and now U.S. Pat. No. 4,752,503, issued June 21, 1988.

The present invention relates especially to a process for the manufacture of a composite material with a refractory fibrous reinforcement and with a ceramic matrix formed by infiltration (for example by chemical vapor deposition inside the pores of the fibrous reinforcement.

Refractory fibers are understood as meaning any fibers which are capable, without undergoing fundamental degradation or modification, of withstanding a temperature of at least 1073° K in an atmosphere which is unreactive towards the fiber—for example carbon fibers, silicon carbide fibers, alumina fibers, etc.

Ceramic matrix is understood as meaning any refractory composition of the oxide, carbide, boride, nitride or similar type, with the exception of carbon. Composite materials of the carbon-carbon type are therefore excluded from the field of this patent.

Chemical vapor deposition (C.V.D.) is understood as meaning the operation which results in a deposit of virtually homogeneous thickness inside the pores of a porous material which are accessible to gases.

Because of its ceramic character, the matrix has a low elongation at break, a poor tensile strength and a high notch sensitivity. To obtain a material of low susceptibility to shocks and to the propagation of cracks initiated by the least defect, it is necessary to have a weak fiber-matrix bond. In that case, however, the material is not structurally strong since it is known that, to obtain composite materials with good mechanical properties, it is necessary to have a strong bond between the reinforcing texture and the matrix.

To solve this dilemma, it has been proposed to produce the reinforcing texture using so-called "duplex" fibers containing a firm central fiber, or core, surrounded by a concentric sheath which is also firm. The sheath is strongly bonded to the matrix, thus providing the firmness, but is weakly bonded to the core so that, in the event of a break in the texture, energy can be absorbed by loss of cohesion between the central fiber and the covering sheath which reinforces it The sheath and the core constitute two fibers one solid and the other hollow—having specific functions but both contributing towards the firmness of the final material.

The object of the present invention is to solve this same problem in a different manner which is simple to put into effect.

This object is achieved by the fact that, according to the invention, a thin, refractory, intermediate adhesive layer of laminar structure is deposited in an oriented fashion on the reinforcing fibers by chemical vapor deposition, this intermediate layer having an elongation at break which is at least greater than that of the matrix and having a thickness of between 0.2 and 3 micrometers.

By virtue of its pronounced elastic character, the intermediate layer permits relaxation of the stresses at the bottom of a crack when a crack in the matrix comes into the vicinity of the fiber. If the level of stress at the bottom of a crack is lower than the local breaking stress of the intermediate layer, the crack is stopped. Otherwise, the crack propagates (with absorption of energy) as far as the next fiber, but, on account of the anisotropic properties of the intermediate layer, this crack can be divided or can propagate without necessarily causing the fiber to break.

Thus, the intermediate layer reduces the susceptibility to crack propagation and increases the impact strength. Furthermore, because of the good bonding of the intermediate layer with the fibers of the reinforcing texture and with the matrix, it is possible to obtain good mechanical properties. It will be noted that the formation of an intermediate layer of this type results in a structure which is quite distinct from the "duplex" fiber structure of the prior art, since the intermediate component of laminar structure does not intrinsically act as a reinforcement.

The material forming the intermediate layer is deposited on the fibers by chemical vapor deposition (C.V.D.). This material is, for example, laminar pyrocarbon or boron nitride, both of which are anisotropic materials with a laminar crystal structure or crystal structure in the form of lamellae weakly bonded to one another and oriented along the fibers because of deposition by C.V.D. These materials have significant properties of elastic deformation under compression perpendicular to the lamellae and under shear parallel to the lamellae, and thus provide the composite material with a macroscopic pseudo-plasticity.

The invention also relates to a composite material such as that obtained by the above process, i.e. a composite material with fibrous reinforcement and ceramic matrix in which, according to the invention, a thin, refractory, intermediate adhesive layer of laminar structure is deposited on the reinforcing fibers by C.V.D., this intermediate layer having an elongation at break which is at least greater than that of the matrix and having a thickness of between 0.2 and 3 micrometers.

Practical examples of the process according to the invention are given below by way of indication but without implying a limitation.

EXAMPLE 1

A reinforcing texture is produced by the winding/dry compaction of a fabric based on carbon fibers with high mechanical characteristics, marketed by the Japanese Company Toray under the name "T 300", to give a preform in which the proportion of fibers is equal to 50% by volume. This dry texture, held in a tool, is subjected to C.V.D. of laminar pyrocarbon having a large elongation at break. A pyrocarbon of this type is obtained by C.V.D. starting from methane gas ($CH_4$), for example, under reduced pressure (1.3 mbar), at a temperature of 1323° K. This preform, still held in its tool, is then thoroughly infiltrated and totally densified by a silicon carbide matrix obtained by C.V.D. in accordance with a technique known per se. The final result obtained is a composite material with carbon-laminar pyrocarbon fibers and with a silicon carbide matrix.

Table 1 below gives the results of tests carried out on different test-pieces obtained by varying the duration of deposition of laminar pyrocarbon, i.e. the thickness of the intermediate coating. The test-pieces were in the form of cylinders with a diameter equal to 10 mm and a length equal to 100 mm. By way of comparison, Table 1 also shows the results of test carried out on a composite material of the carbon-silicon carbide type (no intermediate deposition of laminar pyrocarbon—Test no. 1)

and a composite material of the carbon-carbon type (matrix formed entirely of laminar pyrocarbon—Test no.6).

The characteristics measured were the thickness (e) of the intermediate layer of laminar pyrocarbon, the 3-point flexural breaking stress ($\sigma F$ 3 points), the apparent modulus of elasticity ($E_o$), the compressive breaking stress ($\sigma C$) and the impact strength.

TABLE 1

| No. | e ($\mu m$) | $\sigma F$ (MPa) 3 points | $E_o$ (GPa) | $\sigma C$ (MPa) | Impact strength (daN × cm) |
|---|---|---|---|---|---|
| 1 | 0 | 62 | 155 | 405 | 3 |
| 2 | 0.2 | 415 | 132 | 583 | 12 |
| 3 | 0.7 | 780 | 128 | 527 | 16 |
| 4 | 1.5 | 794 | 118 | 570 | >40 |
| 5 | 10 | 680 | 75 | 360 | >40 |
| 6 | pyrocarbon matrix | 660 | 77 | 395 | >40 |

Tests 3 and 4 give the best results. It is noted in particular that very good mechanical properties, which are better than those of the composite with a matrix formed entirely of pyrocarbon, are obtained in combination with an excellent impact strength.

Preferably, the thickness of the intermediate layer must exceed a certain minimum in order to give good results. In this respect, a thickness of at least 0.2 $\mu m$ appears to be necessary. However, beyond a certain thickness, a composite with carbon fibers and mixed pyrocarbon-SiC matrix is obtained in fact, rather than a composite with carbon-pyrocarbon fibers and SiC matrix, and the results deteriorate (see Test no. 5). This upper limit depends to a certain extent on the pore size; in general terms, it does not seem to be desirable to exceed a thickness of 3 $\mu m$ for the laminar layer.

The results also show that the properties obtained are due to the effect of elastic mechanical bonding and not to a preferential loss-of-cohesion effect between the fibers and their sheaths because, in that case, the same values would be otained irrespective of the thickness of the intermediate layer. This is also confirmed by the excellent fatigue resistance of the material, since a test-piece identical to those of Test no. 4 underwent 106 deformation cycles at 80% $\sigma F$ without breaking and then exhibited a permanent deformation, which clearly shows that the ultimately inescapable cracking of the matrix does not cause the material to break immediately.

EXAMPLE 2

A reinforcing texture is produced by the flat stacking of layers of firm carbon fiber fabric. This texture is compacted dry to give a preform in which the proportion of fibers is equal to 50% by volume. This dry texture, held in a tool, is subjected to C.V.D. of laminar pyrocarbon to form an intermediate layer with a thickness equal to about 1.5 $\mu m$ on the fibers. The preform, still held in the tool, is then thoroughly densified by C.V.D. of silicon carbide.

Table 2 gives the measured values of the 4-point flexural breaking stress ($\sigma F$ 4 points) and the apparent modulus of elasticity, the measurements having been made on parallelepipedal test-pieces with a length of 70 mm, a width of 9.5 mm and a thickness of 2.5 mm. The values measured on test-pieces of carbon-silicon carbide composite, obtained in the same way except for the intermediate deposition of laminar pyrocarbon, are given by way of comparison.

TABLE 2

| Thickness of pyrocarbon ($\mu m$) | $\sigma F$ 4 points (MPa) | $E_o$ (GPa) |
|---|---|---|
| 0 | 384–409–214 | 145–150 |
| 1.5 | 533–538–526 | 120–130 |

EXAMPLE 3

The procedure of Example 2 is followed, the high-strength carbon fabric being replaced with a high-modulus fabric based on carbon fibers marketed by the Japanese Company Toray under the name "M4O", and the 3-point flexural breaking stress being measured on test-pieces of the same dimensions. The measured values are:

| Thickness of pyrocarbon ($\mu m$) | $\sigma F$ 3 points (MPa) |
|---|---|
| 0 | 166–101–169–138 |
| 1.5 | 355–252–350 |

EXAMPLE 4

The procedure of Example 3 is followed, the carbon fabric being replaced with a silicon carbide fabric formed of "Nicalon" fibers from the Japanese Company NIPPON CARBON, and starting from a preform in which the proportion of fibers is equal to 40% by volume. The measured values are:

TABLE 4

| Thickness of pyrocarbon ($\mu m$) | $\sigma F$ 3 points (MPa) |
|---|---|
| 0 | 151–133–157–186 |
| 1.5 | 317–374–343–337 388–340 |

It is interesting to note (Examples 2, 3 and 4) that the presence of an intermediate layer not only results in better mechanical properties but also substantially reduces the scatter of the values of the mechanical characteristics and hence increases Weibull's modulus; this proves particularly advantageous in terms of the dimensioning and use of the composite material obtained. It is also pointed out that the improvement in the mechanical properties is not governed by the nature of the fibers of the reinforcing texture.

EXAMPLE 5

A material such as described in Example 4 is produced, but the intermediate pyrocarbon layer is replaced with pyrolytic boron nitride (BN) obtained by C.V.D. at 1423° K, under a total pressure of 26 mbar, the reactive gas used being ammonia ($NH_3$) and boron trifluoride ($BF_3$) in the ratio $NH_3/BF_3 = 1.4$. The deposition time is restricted to give a 1.5 $\mu m$ layer of BN.

After infiltration with SiC, an SiC (BN)-SiC material is therefore obtained. The resulting material is firm and moreover does not exhibit the brittle type of breaking, in contrast to the same material produced without the intermediate BN layer.

If this material is placed for 25 hours in an oxidizing atmosphere (air) in a furnace at 1273° K, it is observed that the weight of the sample has not changed significantly and that the material is still strong and still exhibits the non-brittle type of breaking.

If this same oxidation treatment is carried out on a material such as described in Example 4, on the other hand, a weight loss due to oxidation of the pyrocarbon is observed and the material suffers a considerable deterioration of its mechanical properties, although its mode of breaking is still of the nonbrittle type.

This example shows the value of using an intermediate layer of laminar BN in cases where non-oxidizable matrix/fiber composites are used in an oxidizing atmosphere.

EXAMPLE 6

A material such as described in Example 2 is produced, but a multidirectional arrangement (3D in the present example) of carbon fibers is used.

Test-pieces for measuring 3-point flexural breaking stress, with a diameter of 10 mm and a length of 100 mm, are machined from the C (pyro C)-SiC material produced in this way.

Table 5 gives the results obtained, compared with those for test-pieces having the same dimensions and made of a C-SiC material of the prior art.

TABLE 5

|  | e (μm) of pyrocarbon | σF 3 points (MPa) | $E_o$ (GPa) |
|---|---|---|---|
| According to the prior art | 0 | // 127 | 150 |
|  | 0 | ⊥ 117 | 130 |
| According to the present invention | 1.5 | // 380 | 105 |
|  | 1.5 | ⊥ 340 | 100 |

This example shows that the insertion of an elastic layer—in this case pyrocarbon—also improves the mechanical properties of materials with a multidirectional texture, both along one of the directions of the fibrous reinforcement (symbol //) and perpendicular thereto (symbol ⊥).

In the preceding examples, the matrix is produced by C.V.D. Other methods for producing the matrix can be envisaged and do exist, without calling into question the present invention relating to the insertion of a layer of pronounced elastic character between the fiber and the matrix. Thus, the matrix can be totally or partially obtained by the thermal decomposition of a liquid or fusible compound impregnating the fibrous reinforcement, the latter being coated beforehand with the laminar intermediate layer, formed of pyrocarbon or boron nitride for example, according to the invention.

By way of illustration, an SiC matrix can be produced from a polycarbosilane, in the molten form or in solution, which impregnates a fibrous reinforcement treated beforehand according to the invention. Thermolysis of this polycarbosilane leads to the SiC matrix in one or more impregnation/thermolysis cycles.

Similarly, the matrix can be produced starting with metal alcoholates, which lead to an oxide matrix by the decomposition of an intermediate gel (for example an aluminium butylate will lead to an alumina matrix).

What is claimed is:

1. A composite structure comprising
   (a) a fibrous reinforcing body formed from fibers of a refractory material;
   (b) a ceramic matrix surrounding the fibers of the reinforcing body; and
   (c) an intermediate layer of a refractory material having a laminar structure disposed between the fibers of the refractory material and the ceramic matrix and adherent to both, wherein said intermediate layer has a thickness sufficient to reduce the susceptibility of the structure to crack propagation and to increase impact strength not exceeding 3.0 microns is elastically deformable in shear and has an elongation at break greater than the matrix.

2. A structure according to claim 1, wherein the intermediate layer has a thickness of from 0.2 to 3 microns.

3. A structure according to claim 1, wherein the intermediate layer consists essentially of laminar pyrolytic carbon.

4. A structure according to claim 1, wherein the intermediate layer consists essentially of boron nitride.

5. A structure according to claim 1, wherein the reinforcing body is formed from carbon fibers.

6. A structure according to claim 1, wherein the reinforcing body is formed from silicon carbide fibers.

* * * * *

UNITED STATES PATENT AND TRADEMARK OFFICE
CERTIFICATE OF CORRECTION

PATENT NO. : 5,026,604

DATED : June 25, 1991

INVENTOR(S) : Thebault

It is certified that error appears in the above-identified patent and that said Letters Patent is hereby corrected as shown below:

Title page, Item 56, add the following to the list of U. S. Patent Documents: --4,275,095 6/1981 Warren--. Title page, 2nd col., 16th line, "Fibre" should read --Carbon Fibre--. Title page, lines 6-7 of ABSTRACT, delete "having a laminar structure disposed between the fibers of the refractory material". Col. 1, line 50, "fibers one" should read --fibers - one--. Col. 2, line 66, "test" should read --tests--. Col. 3, line 45, "106" should read --$10^6$--. Col. 6, line 31, "not" should read --but not--; line 32, "is" should read -- , is--.

Signed and Sealed this

Sixth Day of October, 1992

Attest:

DOUGLAS B. COMER

Attesting Officer    Acting Commissioner of Patents and Trademarks